United States Patent [19]

Dornbusch et al.

[11] Patent Number: 4,883,697

[45] Date of Patent: Nov. 28, 1989

[54] THERMOPLASTIC IN-MOLD LABELING LABEL STRUCTURE FOR DEFORMABLE THERMOPLASTIC PACKAGES

[75] Inventors: Arthur H. Dornbusch; Roger E. Schanzle, both of Cincinnati, Ohio; Irvin L. Brazier, West Milwaukee, Wis.

[73] Assignee: The Procter & Gamble Company, Cincinnati, Ohio

[21] Appl. No.: 223,055

[22] Filed: Jul. 22, 1988

Related U.S. Application Data

[63] Continuation-in-part of Ser. No. 67,771, Jul. 8, 1987, abandoned, which is a continuation-in-part of Ser. No. 889,031, Jul. 23, 1986, abandoned.

[51] Int. Cl.[4] .................. B32B 27/08; B65D 25/34
[52] U.S. Cl. .................. 428/35.7; 428/36.92; 428/347; 428/348; 428/349; 428/354; 428/355; 428/216; 428/458; 428/480; 428/522; 428/914; 428/217; 40/310; 40/299
[58] Field of Search .................. 40/2 R, 310; 428/40, 428/317.3, 318.4, 343, 346, 351, 354, 914, 36.5, 36.92, 35.7, 216, 217, 458, 480, 522, 355, 347, 348, 349

[56] References Cited

U.S. PATENT DOCUMENTS

| | | | |
|---|---|---|---|
| 2,292,024 | 8/1942 | Dreher | 40/140 |
| 3,359,127 | 12/1967 | Meyer et al. | 117/3.4 |
| 3,573,125 | 3/1971 | Elliott | 156/244 |
| 3,692,610 | 9/1972 | Kornstein | 156/249 |
| 3,854,229 | 12/1974 | Morgan | 40/2 |
| 3,887,734 | 6/1975 | Chazan | 428/40 |
| 3,995,087 | 11/1976 | Desanzo | 428/315 |
| 4,048,736 | 9/1977 | Castleman et al. | 40/2 R |
| 4,264,657 | 4/1981 | Tollette | 428/35 |
| 4,273,816 | 6/1981 | Tollette | 428/35 |
| 4,330,352 | 5/1982 | Grimes et al. | 156/235 |
| 4,528,055 | 7/1985 | Hattemer | 156/247 |
| 4,567,681 | 2/1986 | Fumei | 40/310 |
| 4,581,262 | 4/1986 | Karabedian | 428/35 |

FOREIGN PATENT DOCUMENTS 747341 11/1966 Canada .................. 154/123

Primary Examiner—Ellis P. Robinson
Assistant Examiner—James J. Seidleck
Attorney, Agent, or Firm—R. C. Witte; J. V. Gorman

[57] ABSTRACT

A flexible multilayer label adapted for application to deformable thermoplastic packages, with such label being impervious to water and sufficiently resilient to avoid permanent deformation upon deflection. The label includes a thermoplastic stress-compensating stratum having a relatively elastic structure which has a Young's Modulus less than about 2800 Kg/cm$^2$ and a lower surface adapted to be bonded to the outer surface of the thermoplastic package during in-mold labeling procedures. The label further includes a thermoplastic label stratum having a Young's Modulus which exceeds about 7030 Kg/cm$^2$ and a smooth label surface. The label stratum is laminated to the upper surface of the stress-compensating stratum. The stress-compensating stratum structure accommodates the thermal stresses and package shrinkage inherent in such in-mold labeling procedures, as well as stresses imposed by deformation of the package in use. As a result of such accommodating capabilities, the label surface of the label stratum is effectively isolated from such stresses and shrinkage and remains substantially smooth, and the laminated bonds between the label stratum, the stress-compensating stratum, and the deformable package remain substantially intact.

11 Claims, 3 Drawing Sheets

THERMOPLASTIC IN-MOLD LABELING LABEL STRUCTURE FOR DEFORMABLE THERMOPLASTIC PACKAGES

This is a continuation-in-part of application Ser. No. 067,771, filed on July 8, 1987, now abandoned, which was a continuation-in-part of application Ser. No. 889,031, filed on July 23, 1986, now abandoned.

TECHNICAL FIELD

This invention relates to in-mold labeling label structures for thermoplastic packages, and, more particularly, to a multilayer thermoplastic in-mold labeling label structure for deformable thermoplastic packages.

BACKGROUND ART

Over the years, many label structures have been used and attached to various cartons, packages and the like. In this regard, different label structures have been utilized to conform with various needs and packaging requirements. An example of a somewhat specialized label structure is shown in U.S. Pat. No. 4,264,657, which issued to H. B. Tollette on Apr. 28, 1981. In particular, the Tollette structure included a foam layer, an intermediate printed layer, and a clear plastic film top layer. The foam layer of the Tollette label was designed to serve as a cushion to protect the labeled container from shocks and impacts experienced during shipping and handling, and the outer printed layer was to comprise a printed paper layer. The Tollette label structure was contemplated for use on glass containers which commonly were to be subjected to glass-to-glass packaging.

Another label structure designed for a particular and somewhat specialized application is shown in U.S. Pat. No. 4,528,055, which issued to J. C. Hattemer on July 9, 1985. In particular, the Hattemer patent concerns a label which can include a removable central coupon area which is detachable from the balance of the label and serves as a redemption, discount or promotional coupon for the product. The Hattemer label includes a pressure-sensitive paper base sheet, a paper top sheet, and a clear barrier sheet therebetween. These three layers are laminated together such that the top sheet can be removed while the clear barrier sheet remains attached to the base layer. The barrier layer prevents ink and other graphic printing from the top sheet to transfer to the base sheet.

Another multilayered label structure is shown in U.S. Pat. No. 4,581,262, which issued to J. A. Karabedian on Apr. 8, 1986. The Karabedian sleeve label is a coextruded multilayer sheet comprising a lower foam layer to be situated on the inside of the sleeve next to the container, and an outside printable solid skin layer made of a blend of high density polyethylene, block copolymer of styrene and butadiene, and polystyrene. Similarly, the brittle foam layer is to be a polystyrene material, and the foam and skin layers are bonded together such that the sheer bond strength therebetween is less than the yield strength of the tough outer skin, whereby when sheer stress is applied to the label laminate, the foam layer tears slightly away from the skin layer and the skin resists tearing. The label is contemplated to be heat shrunk onto the outside of a container and attached to such container only at limited points to facilitate easy removal of such label for recycling of the container. A similar label structure including the brittle foam layer and the outer tough skin is illustrated in U.S. Pat. No. 4,567,681, which issued to G. J. Fumei on Feb. 4, 1986. The Fumei plastic label includes a polystyrene foam layer which provides a solvent-soluble label portion whereby the plastic label can be wrapped around the container and attached to itself and the container only at predetermined finite areas. This limited attachment enables the easy removal of the label for recycling of the container.

Paper and paper-like labels having also been used in the in-mold labeling context in the formation of blow-molded containers. In this regard, it has been found that it is advantageous to place the paper label within the blow-molding mold prior to the expansion of a heated preform, whereby the paper label is integrally attached to the outer surface of the blow-molded container during such blow-molding procedures. An example of a transfer device for applying labels to blow-molds is shown in U.S. Pat. No. 4,359,314, which issued to E. W. Hellmer on Nov. 16, 1982. As explained in the Hellmer patent, the transfer device picks up a label from a stack of labels and moves the label into alignment with a pre-selected portion of the inner surfaces of a female mold cavity prior to blow-molding. Thereafter, a container preform is blown against the inner walls of the closed mold cavity and the label is adhered to the outer surface of such stretched pre-form.

While in-mold labeling procedures, such as described in the Hellmer reference, have certainly helped improve the economics, performance and appearance of labels on blow-molded thermoplastic containers, it has been found that conventional label stock materials often wrinkle, delaminate, or otherwise deteriorate under the thermal and mechanical stresses imposed thereon by the in-mold labeling procedures. In particular, the high heat inherent in in-mold labeling, and the subsequent shrinkage of the blow-molded thermoplastic material as it cools impose relatively severe stresses upon conventional label stock material, often causing the label to wrinkle, bubble, delaminate from the container and/or other layers of the label, or otherwise experience deterioration in its graphics or general appearance. Such deterioration and poor performance can become especially acute if the container is exposed to squeezing and/or a moist or wet environment. Despite the growing use of in-mold labeling in the industry, there remain problems in maintaining a smooth label surface and in maintaining the bonds of lamination between the label and the container and the various label laminated layers. Prior art label stock did not adequately provide solutions to these problems.

DISCLOSURE OF THE INVENTION

It is an object of this invention to obviate the above-described problems.

It is another object of the present invention to provide a flexible multilayer label adapted for application to deformable thermoplastic packages via in-mold labeling procedures.

It is yet another object of the present invention to provide a flexible multilayer label for application to deformable thermoplastic packages via in-mold labeling procedures, wherein such label is impervious to water and sufficiently resilient to avoid permanent deformation (e.g. wrinkling, cracking, delamination, etc.) upon deflection.

It is also an object of the present invention to provide a flexible multilayer label which can be conveniently applied to deformable thermoplastic packages via in-mold labeling procedures, wherein the flexible label includes a stress-compensating stratum which accommodates the thermal stresses and package shrinkage inherent in such in-mold labeling procedures, as well as stresses imposed by deformation of the package in use, such that the outer label surface remains substantially smooth.

In accordance with one aspect of the present invention, there is provided a non-paper flexible multilayer label adapted for application to deformable thermoplastic packages via in-mold labeling procedures. The label is impervious to water and sufficiently resilient to avoid permanent deformation upon deflection, and includes an unfoamed lastic thermoplastic stress-compensating stratum which has a Young's Modulus less than about 2800 Kg/cm$^2$ and a thickness in the range of from about 0.025 mm to about 0.076 mm. A thermoplastic, low temperature heat-activated sealant layer is laminated to the lower surface of said stress-compensating stratum. A thermoplastic label stratum which has a Young's Modulus greater than about 7030 Kg/cm$^2$ and a smooth label surface, is laminated to the upper surface of the stress-compensating stratum.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DETAILED DESCRIPTION OF THE INVENTION

Figure 1:
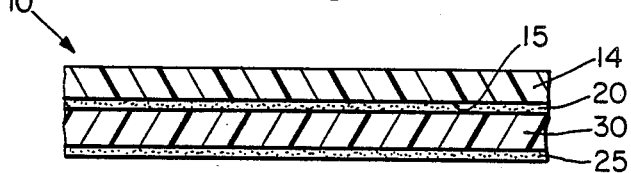
FIG. 1 is an enlarged partial cross-sectional view of a flexible multilayer label structure made in accordance with the present invention.

Referring now to the drawings in detail, wherein like numerals indicate the same elements throughout the views, a flexible multilayer non-paper label 10 is shown in FIG. 1 as comprising a stress-compensating stratum 30, a thermoplastic label stratum 14, and means 20 for laminating label stratum 14 to the upper surface of stress-compensating stratum 30. Stress-compensating stratum 30 further includes a lower surface 25 adapted to be bonded to the outer surface of a thermoplastic package during in-mold labeling procedures.

Stress-compensating stratum 30 can be formed from a wide range of thermoplastic materials (e.g. low density polyethylene) as long as such stratum features an overall structure having relatively elastic characteristics such that (as will be described in greater detail below) the thermal stresses, post-mold shrinkage of the blown thermoplastic package, and various mechanical stresses imposed by deformation of the package in use can be accommodated by such stratum without damaging the label stratum laminated thereto. In this regard, it has been found that conventional single-layer and multilayer film label structures become wrinkled, cracked, creased, or delaminated due to degradation of the label material and/or the bonds between the individual label layers and/or the thermoplastic container when subjected to the inherent thermal stresses imposed by in-mold labeling procedures, and due to shrinkage of the blow-molded package beneath the label attached thereto as the package cools following such blow-molding procedures. In addition, similar degradation results during normal use of a labeled thermoplastic package when subjected to repeated squeeze-type dispensing operations, and when such package is exposed to a wet environment (e.g. a shower or bath environment).

In order to obviate these negative performance characteristics of standard label structures, it has been found that, among other things, the label structure must be flexible and sufficiently resilient to avoid permanent deformation (e.g. wrinkling, creasing, cracking, etc.) upon deflection of the label support surface. Applicants have found that a stress-compensating stratum (e.g. 30) having relatively elastic integrity can be advantageously employed to effectively isolate a label stratum (e.g. label stratum 14) from such stresses and shrinkage. In particular, the structure of the stress-compensating stratum must be elastic enough to readily distort in response to thermal and mechanical stresses without transferring such stresses and/or distortion to other label layers laminated thereto. In this way, the stress-compensating stratum "accommodates" such thermal and mechanical stresses by dispersing the same within such elastic stratum, effectively "absorbing" the stresses and isolating the balance of the label structure therefrom.

It has further been found that such stress-compensating stratum can be a pliable, adaptable structure such as one or more layers of EVA copolymer film or similar unfoamed thermoplastic film material. These materials should be machine handleable and have a Modulus of Elasticity (Young's Modulus) of less than about 2800 Kg/cm$^2$ (40,000 psi) according to ASTM test method D882. EVA copolymer is a copolymer of ethylene and vinyl acetate, and for the purpose of the present invention ranges from about 1% to about 12% by weight vinyl acetate. A range of about 3% to about 6% is preferred. Examples of these structures are described more fully below, however, the critical requirement of the stress-compensating stratum is that it must be sufficiently elastic to accommodate the described stresses without transferring the same to other label layers. As used herein, the term "accommodate" shall be used to connote the idea that the stress-compensating stratum disperses or absorbs such stresses without transmitting the same to other strata or layers of the label.

FIG. 1 illustrates an embodiment of a flexible multilayer label 10 including such a stress-compensating stratum 30. In particular, stress compensating stratum 30 can be a relatively thin (e.g. from about 0.00075 inches or 0.019 mm to about 0.003 inches or 0.076 mm, preferably about 0.00125 inches or 0.032 mm to about 0.00175 inches or 0.044 mm in thickness) EVA copolymer film layer, nominally about 3% by weight vinyl acetate, having a low temperature heat-activated sealant laminated to its inner surface 25 to provide the required capability of bonding stratum 30 to the outer surface of a thermoplastic package during in-mold labeling procedures. The stress compensating stratum described can be obtained from Deerfield Plastics Co., Deerfield, MA, identified as Grade 915 EVA.

The low temperature sealant (hereinafter referred to as "LTS") should be non-blocking and is preferably an ethylene-vinyl acetate copolymer, paraffin, microcrystalline wax mixture, such as described in U.S. Pat. No. 3,573,125, which issued to B. W. Elliot on Mar. 30, 1971, the disclosure of such patent being hereby incorporated herein by reference. Such ethylene-vinyl acetate copolymer-wax LTS can be obtained from Milprint, Inc., Milwaukee, Wis. The LTS preferably comprises a composition of about 40% by weight wax, 35% by weight ethylene-vinyl acetate copolymer and 25% by weight of tackifying agent, although the proportions can be varied to some extent. The wax can comprise about 80–85% microcrystalline wax having a melting point of about 155° F. to about 160° F. (68° C. to 71° C.) and about 15–20% paraffin having a melting point of about 150° F. to 155° F. (66° C. to 68° C.). The ethylene-vinyl acetate copolymer can comprise about 27–30% by weight vinyl acetate and have a melt index of about 1.2 as determined by ASTM method D12380-62T. The tackifier can be styrene vinyltoluene copolymer.

The LTS can be applied by extrusion coating techniques known in the art at a rate of about 14 pounds (6.4 Kg) per ream, a thickness of about 0.001 inches (0.025 mm). It tends to soften at 135° F. (57° C.) with an initial melting or flowing point (i.e. the lowest temperature in the LTS melting range) of from about 140°–145° F. (60°–63° C.). The LTS provides overall wetting and adhesion to the expanded parison with adequate strength to adhere the label to the bottle under typical use conditions, as described later. The bonding strength of the label to the bottle has been determined to be about 1.5 to 2.5 pounds per linear inch. At normal storage and/or application conditions no significant blocking of the adhesive occurs between the LTS and the outer label ply. Other means for providing the bonding capabilities of the lower surface of stress-compensating stratum 30 to the outer surface of a thermoplastic package could be substituted for the described LTS layer; however, the ethylene-vinyl acetate copolymer-wax LTS is preferred for its exceptionally good flow characteristics, good latitude with respect to temperature differentials during the in-mold container forming process, and its superior general versatility vis-a-vis alternative bonding materials.

Thermoplastic label stratum 14 is laminated to the upper surface of stress-compensating stratum 30. It should be noted that the term "laminated" is used herein to connote any mean of bonding two layers together, whether by adhesives, co-extrusion, coating processes or any other means known or hereafter developed in the industry. Means 20 for laminating these two strata preferably comprises a standard adhesive commonly available in the industry, such as an epoxy- type urethane (e.g. as available under the trade name Lamal or Adcote, both from the Morton Thiokol Company). The exact choice of means for laminating label stratum 14 to stress-compensating stratum 30 would, of course, depend upon the materials chosen for such strata in a particular structure.

The label stratum 14 can be any thermoplastic which has a smooth surface, is resistant to heat shrinkage on brief exposure to temperatures up to about 205° C. (400° F.) provides a good bonding surface for metalizing and has a Young's Modulus higher than about 7030 Kg per cm² (100,000 psi). Examples of suitable materials are polyethylene terephthalate (PET) film, polystyrene film and cast polypropylene film. The label stratum 14 should be thin and preferably has a thickness in the range of from about 0.00025 inches (0.0064 mm to about 0.001 inches (0.025 mm). If the label stratum 14 is made substantially thicker it will increase the stresses in stress compensating stratum 30, requiring increased thickness thereof and stresses between the layers would increase accordingly. A further problem is that the increased overall thickness of the label 10 would have a higher insulating value, which will increase the time required for each blow molding cycle and consequently increase the cost of applying the label 10.

As discussed, label stratum 14 is to have a smooth label surface. In FIG. 1, smooth label surface 15 is shown as being located on the inner surface of label stratum 14. Although it may be preferred to locate the smooth label surface on the interior of label stratum 14 for protection of printed graphics and the like, such smooth label surface could equally be located on the outer side of label stratum 14. As will be seen below, where it is desirable to more effectively isolate label surface 15 from the described thermal stresses and mechanical stresses encountered in shrinkage and deformation of the package walls, it may often be preferred that smooth label surface 15 be located on the outer face of label stratum 14.

As will also be described in greater detail below, flexible multilayer label 10 is designed to be placed within a female blow-mold cavity with lower surface 25 of stress-compensating stratum 30 being oriented toward the interior of such cavity. A heated thermoplastic parison is then blow-molded against multilayer label 10 and the interior walls of such female mold cavity during blow-molding procedures, and lower surface 25 of stress-compensating stratum 30 is thereby bonded to the outer surface of the expanded thermoplastic material by interaction of the LTS and the heated parison.

Figure 2:
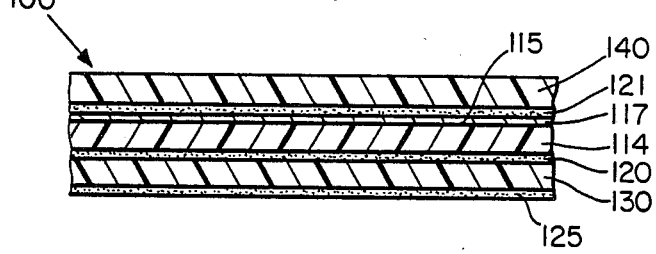
FIG. 2 is an enlarged partial cross-sectional view of an alternate embodiment of a flexible multilayer label structure made in accordance with the present invention.

An alternate embodiment of a non-paper flexible multilayer label made in accordance with the subject invention is shown in FIG. 2. In particular, label 100 includes a thermoplastic stress-compensating stratum 130 having a lower surface 125 adapted to be bonded to the outer surface of a thermoplastic package during in-mold labeling procedures, as described with regard to label 10 above. In this regard, it is contemplated that lower surface 125 might comprise an ethylene-vinyl acetate copolymer-wax LTS, as described above, laminated to the lower surface of a EVA copolymer film stress-compensating stratum 130. Similarly, label 100 includes a thermoplastic label stratum 114 and means for laminating label stratum 114 to the upper surface of stress-compensating stratum 130. Additionally, label 100 includes a thermoplastic outer or protective layer 140.

Often it is desired to include special ornamental label effects, such as printed and metallic portions, to enhance the overall and decorative appearance of a label. FIG. 2 illustrates a flexible multilayer label 100 wherein the upper surface 115 of label stratum 114 has been metalized (e.g. stratum 114 may be film which has a very thin layer 117 of metal particles deposited on its upper surface—such as by the commonly known vacuum metalizing process). In order to achieve good bonding characteristics of metalized surface 115 to label 100, it is preferred that label stratum 114 comprise a polyethylene terephthalate or PET film (a polyester film commonly available from the E.I. DuPont Company) to provide a superior bonding surface for such metalized material. As was the case with label 10 above, it is contemplated that label stratum 114 be laminated to the upper surface of stress-compensating stratum 130 by a standard adhesive layer 120, such as the epoxy-type urethane mentioned above. Similarly, a protective layer 140 such as a polyethylene film is preferably laminated to the upper surface of metalized surface 115 by a second layer of epoxy-type urethane adhesive 121. Again, exact choice of means to laminate the individual layers of the label structure to one another should be chosen in accordance with the specific material of such layers and to insure compatibility with in-mold labeling requirements. For example, if EVA copolymer material were used for stresscompensating stratum 130, a superior lamination bond between such EVA copolymer and the PET of label stratum 114 would preferably be accomplished by the use of a high-heat resistant adhesive such as a polyurethane retort adhesive (as commonly available from the Morton Thiokol Company under the trade name Adcote 506 or 102a) at bonding layer 120, as opposed to the epoxy-type urethane described above. On the other hand, the Lamal or Adcote adhesvie noted above would be adequate for adhesive layer 121 between a printed polyethylene protective layer 140 and the metalized PET label stratum 114. The Lamal adhesive would be particularly preferred for adhesive layer 121 if the upper surface of label stratum 114 or the lower surface of protective layer 140 were printed with inks, as Lamal adhesive is known to chemically react with inks to create a relatively strong bond.

Whenever a metalized surface is incorporated into a laminate structure, such as shown and described with regard to label 100 in FIG. 2, if it is desired to maintain a smooth shiny appearance, it is critical that such metallic surface be protected from the thermal and mechanical stresses imposed by the in-mold labeling process and the inherent subsequent shrinkage of the blown thermoplastic material as cooling takes place. In this regard, it is known that heat can distort the metallic surface and degrade the adhesion of such metal to thermoplastic surfaces. Because such metal adhesion is inherently weak anyway, it is critical that a flexible label include structure to effectively isolate the metallic layer from such heat and related stresses. Therefore, like the smooth surface of the thermoplastic label stratum to which it is attached, it is preferred that the metalized surface be located as remotely as practicable from such stresses. In this regard, it has been found that to minimize the potential harmful effects concomitant with in-molding labeling procedures, the metalized layer 117 is preferably located on smooth upper surface 115 of label stratum 114. This is true because the closer a metallic layer is to the source of heat (i.e. the heated thermoplastic parison which is blown against the low temperature sealant 125 laminated to the lower surface of the stress-compensating stratum 130), the more such metal material acts as a heat sink. The more heat absorbed by the metallic layer, the less adhesion it will have to adjacent thermplastic layers. In addition, such heat tends to distort metallic surfaces, further degrading appearance and adhesion to adjacent thermoplastic surfaces. Therefore, it is critical to effectively isolate the metalized layer 117 and the smooth label surface 115 of label stratum 114 from these thermal stresses and the related stresses caused by shrinkage of the thermoplastic package as it cools following blow-molding procedures.

When metalized surfaces are to be included in the label, it is preferred that label stratum 114 be formed of PET film, as PET is well known for its strong bonding capabilities with metallic surfaces (i.e. vacuum metalized film). It is also preferred that materials which are substantially impervious to water and moisture be used for each of the label strata and layers described herein, as materials affected by humidity and moisture can allow delamination of label stratum when exposed to a wet or moist environment.

Because blow-molded packages are often deformable in use, it is also very important that a flexible multilayer label be sufficiently resilient to avoid permanent deformation (i.e. wrinkling, cracking, creasing, etc.) upon deflection when mounted on the bottle support surface. The relatively thin thermoplastic and metallic materials described above with regard to the various label strata and layers provide such resilience, and are also impervious to water.

Figure 3:
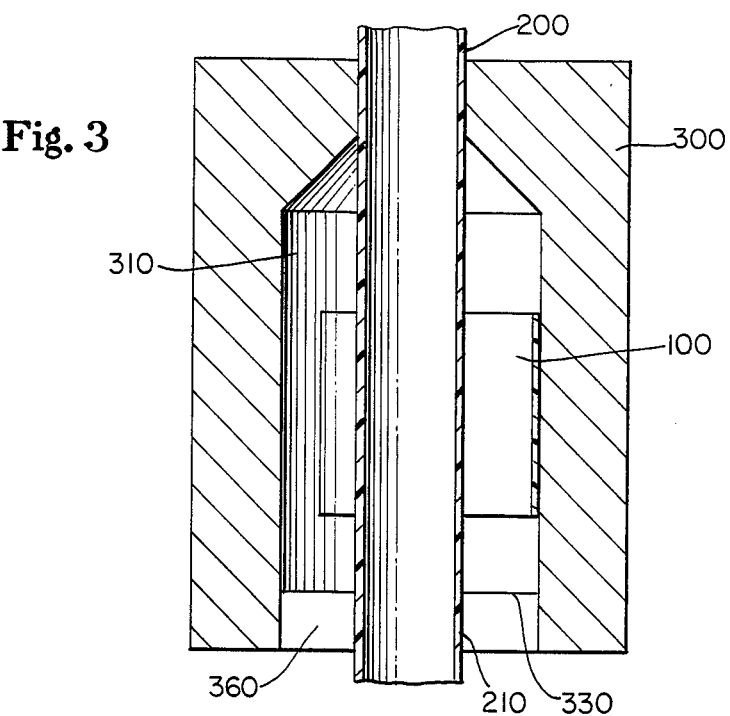
FIG. 3 is a partial cross-sectional view of a female blow-mold cavity shown prior to the blow-molding procedure and having a flexible multilayer label structure placed against its inner surfaces.
Figure 4:
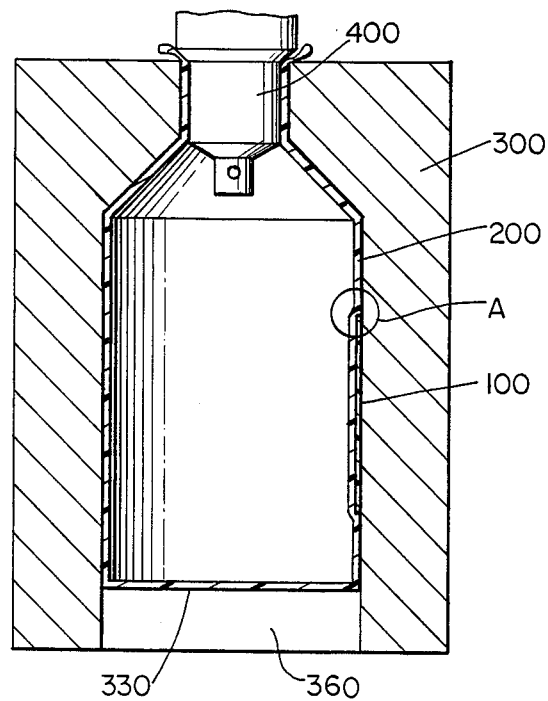
FIG. 4 is a cross-sectional view of the female blow-molding cavity of FIG. 3 subsequent to the expansion of a heated thermoplastic preform against the inner surfaces thereof and against the flexible multilayer label structure held therewithin.
Figure 5:
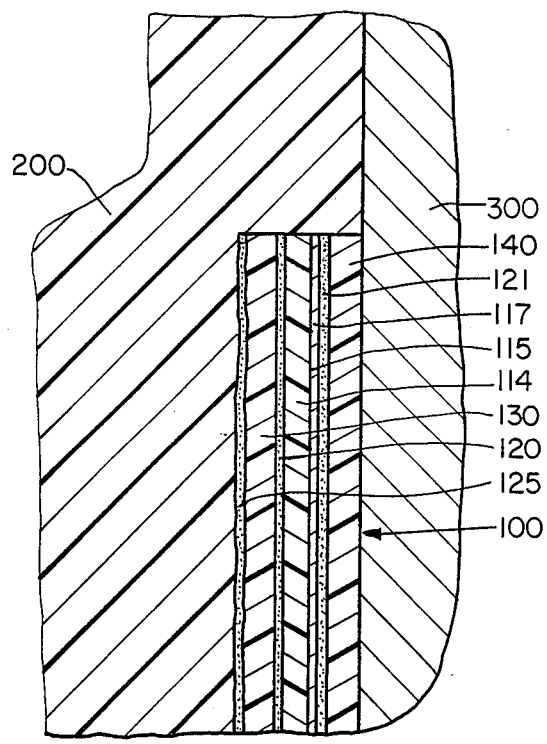
FIG. 5 is an enlarged partial cross-sectional view of a portion A of FIG. 4 illustrating a portion of the resulting blow-molded container wall including the flexible multilayer label structure after in-mold labeling procedures.

FIG. 3 shows a cross-sectional view of a female blow-molding mold unit after a flexible multilayer label (e.g. label 100) has been placed therewithin. Such label might be placed in the open half of a female mold unit by any of a number of methods known in the industry for placing label stock in blow-molding molds prior to in-mold labeling procedures. As shown in FIG. 3, the mold half 300 includes a female mold cavity 310 establishing the shape of a thermoplastic package to be blow-molded therewithin. Label 100 is held within female mold cavity 310 by methods commonly known in the industry, such as by a small vacuum ports (not shown) formed within the cavity 310. Following placement of label 100 within cavity 310, opposite sides of the female mold unit 300 would be closed about an extruded parison 200. When the opposite halves of female mold unit 300 are closed, the lower portion of parison 200 is pinched between corresponding pinch edges 330 in the lower portion of mold unit 300. This pinching action serves to close off the lower end of heated tubular parison 200 to permit formation of the bottom portion of the bottle during blowmolding procedures. Beneath the pinch edges 330 of mold sections 300 are undercut areas 360 which allow excess thermoplastic material 210 to be pinched off from tubular parison 200 without interfering with the complete closure of mold cavity 300. This escess thermoplastic material 210 may be removed by mechanical jaws (not shown) or other similar removal means known in the industry. As illustrated in FIG. 5, the upper portion of the mold unit 300 would then be sealed, such as by the blow-molding plug 400, prior to the expansion of heated parison 200 against the inner surfaces of female mold cavity 310. Thermoplastic parison 200 would, or course, be heated to above its melting point (e.g. between about 380° and about 400° F., or between about 193° and about 204° C. for a high density polyethylene) for extrusion prior to blow-molding. As parison 200 is expanded against the inner surfaces of female mold cavity 310 by a sufficient pneumatic or fluid pressure differential (e.g. supplied via blow-molding plug 400), the heated thermoplastic material contacts and is formed around label 100 held therewithin. Because lower surface 125 is to be oriented inwardly, the low temperature sealant comprising lower surface 125 bonds the multilayer label 100 to the outer surface of the heated thermoplastic parison 200. In this connection, as the parison expands, it contacts the LTS and portions thereof become molten to provide lubrication and wetting to facilitate air displacement from between the label and parison as expansion continues. This is necessary to eliminate air bubbles and thus enhance heat transfer to the balance of the LTS as expansion ceases to effect completion of the melting-/bonding. The expanded thermoplastic material is then cooled, thereby assuming the shape of female mold cavity 310.

FIG. 5 is a greatly enlarged partial cross-sectional view of the area A (FIG. 5) of the in-mold labeled thermoplastic package formed from parison 200 and label 100, illustrating a portion of the thermoplastic package wall including label 100. As shown in FIG. 5, label 100 is bonded to the outer surfaces of the resulting thermoplastic package and is integrated into its external wall surfaces as a result of the in-mold labeling process. During the cooling process, it is a common phenomenon for thermoplastic material to shrink. As seen in FIG. 5, such shrinkage causes some local distortion in the thickness of stress-compensating stratum 130 as a result of its elastic structure. However, such elastic structure does not tend to transfer such local stresses to the label stratum 114 laminated to its upper surface. In this way, stress-compensating stratum 130 serves to accommodate or disperse the various mechanical stresses imposed on label 100 by such shrinkage. Additionally, during the in-mold forming procedure, stress-compensating stratum 130 tends to dissipate or effectively absorb the heat of the heated parison 200, thereby effectively isolating the smooth surface 115 and the metallic layer 117 from such thermal stresses. Protective layer 140 serves to protect the metalized layer 117 of label stratum 114, as well as other graphics and inks printed on metalized layer 117, label surface 115 and/or the inner surface of protective layer 140. Consequently, the unique structure of the flexible multilayer label of the subject invention provides a labeled deformable thermoplastic package having an in-mold film labeled label featuring superior appearance, tactile impression, and durability.

An example of a preferred label 100 is prepared by laminating a thermoplastic stress-compensating stratum 130 made of EVA copolymer to a lower layer 125 of low temperature sealant (LTS), as described above. Such stress-compensating stratum 130 perferably has a thickness of approximately 0.00125 inches (about 0.032 mm) and the LTS is preferably extrusion coated on the stress-compensating stratum at a thickness of about 0.001 inches (0.025 mm). A layer 120 of epoxy-type urethane adhesive is preferably utilized to laminate a label stratum 114 made of PET material to the upper surface of the stresscompensating stratum 130. Most preferably the PET material is approximately 48 gauge (0.0005 inches or 0.0127 mm) and is metalized as desired, with the metalized layer 117 of the label stratum 114 being oriented on the outer face (smooth surface 115) thereof. To protect the metalized label stratum 114, it is preferred that an outer or protective layer 140 of polyethylene film be laminated to the upper surface of label stratum 114. This lamination could preferably be accomplished by the use of an epoxy-type urethane adhesive layer 121 as described above, and such protective layer 140 preferably is polyethylene film having an approximate thickness of about 0.00125 inches (about 0.032 mm). As mentioned above, the inner surface of protective layer 140 could also be printed as desired.

Additional details of the blow-molding procedures for forming thermoplastic packages incorporating the subject labeling structure are not included herein, as such procedures can be undertaken in a variety of ways known in the industry. In this regard, blow-molding temperatures and pressures similar to those set forth in commonly assigned U.S. Pat. No. 4,578,028, which issued to William P. Dirksing et al. on Mar. 25, 1986 can be utilized; the disclosure of such patent being hereby incorporated herein by reference.

As mentioned above, the exact structure of the subject multilayer label can be adjusted as desired in accordance with specific needs and applications. For example, it has been illustrated that the stress-compensating stratum of the subject label can be any of a variety of thermoplastic materials, featuring relatively elastic structures which can accommodate thermal and mechanical stresses without transferring such stresses to other label strata laminated thereto. In this regard, the stresscompensating stratum could be a combination of several different layers of thermoplastic materials laminated together. In addition, it has been shown that protective layers can be laminated above the label stratum as desired. Such protective layers might equally be omitted and/or substituted by a thin layer of varnish or the like, as appropriate. Having shown and described the preferred embodiment of the present invention, further adaptions of the label structure can be accomplished by appropriate modifications by one of ordinary skill in the art without departing from the scope of the present invention. Accordingly, the scope of the present invention should be considered in terms of the following claims and is understood not to be limited to the details of structure and operation shown and described in the specification and drawings.

We claim:

1. A non-paper, flexible, resilient, multilayer label adapted for application to a deformable thermoplastic package by in-mold labeling procedures, said label comprising:

(a) An elastic, machineable, thermoplastic, stress-compensating stratum which comprises an unfoamed film having a Young's Modulus less than about 2800 Kg/cm$^2$, said stress-compensating stratum having an upper and lower surface and a thickness in the range of from about 0.019 mm to about 0.076 mm;

(b) a thermoplastic, low temperature heat-activated sealant layer generally coextensive with and laminated to the lower surface of said stress-compensating stratum; and (c) a thermoplastic label stratum which has a Young's Modulus greater than about 7030 Kg/cm$^2$ and a smooth label surface, said label stratum being laminated to the upper surface of said stress-compensating stratum and having a thickness in the range of from about 0.0064 mm to about 0.025 mm.

2. The label of claim 1 wherein said stress-compensating stratum is a layer of ethylene-vinyl acetate copolymer comprising about 1% to about 12% by weight vinyl acetate.

3. The label of claim 1 wherein said layer comprises about 3% to about 6% by weight vinyl acetate.

4. The label of claim 3 wherein said stress-compensating stratum is less than about 0.04 mm in thickness.

5. The label of claims 1, 2, 3 or 4, wherein said label stratum includes a metalized surface for enhanced decorative appearance.

6. The label of claim 5 wherein said label stratum comprises polyethylene teraphthalate and the metalized surface is on the side opposite that laminated to said stress-compensating stratum.

7. The label of claim 5 wherein said low temperature sealant layer comprises an ethylene-vinyl acetate copolymer-wax composition.

8. The label of any of claims 1 3 and 5, wherein said low temperature sealant layer comprises an ethylene-vinyl acetate copolymer-wax composition.

9. The label of claim 8 wherein said composition comprises ethylenevinyl acetate copolymer, paraffin and microcrystalline wax wherein the copolymer comprises about 27% to about 30% by weight vinyl acetate and has a melt index of about 1.2, the paraffin has a melting point in the range of from about 66° C. to about 68° C., the microcrystalline wax has a melting point in the range of from about 68° C. to about 71° C. and the composition has an initial melting point in the range of from about 60° C. to 63° C.

10. The label of claim 8 wherein said composition comprises ethylene-vinyl acetate copolymer, paraffin and microcrystalline wax wherein the copolymer comprises about 27% to about 30% by weight vinyl acetate and has a melt index of about 1.2, the paraffin has a melting point in the range of from about 66° C. to about 68° C., the microcrystalline wax has a melting point in the range of from about 68° C. to about 71° C. and the composition has an initial melting point in the range of from about 60° C. to 63° C.

11. A package comprising a blow-molded, deformable thermoplastic bottle having a non-paper, flexible, resilient, multilayer label fastened thereto, said label having been applied by in-mold labeling procedures and comprising:
  (a) An elastic, machineable, thermoplastic, stress-compensating stratum which comprises an unfoamed film having a Young's Modulus less than about 2800 KG/cm$^2$, said stress-compensating stratum having an upper and lower surface and a thickness in the range of from about 0.019 mm to about 0.076 mm;
  (b) a thermoplastic, low temperature heat-activated sealant layer generally coextensive with and laminated to the lower surface of said stress-compensating stratum; and
  (c) a thermoplastic label stratum which has a Young's Modulus greater than about 7030 Kg/cm$^2$ and a smooth label surface, said label stratum being laminated to the upper surface of said stress-compensating stratum and having a thickness in the range of from about 0.0064 mm to about 0.025 mm.

* * * * *